(12) United States Patent
Toda et al.

(10) Patent No.: US 7,922,801 B2
(45) Date of Patent: Apr. 12, 2011

(54) CARBON BLACK AQUEOUS DISPERSION AND METHOD OF PRODUCING THE SAME

(75) Inventors: Shigemi Toda, Tokyo (JP); Makoto Sekiyama, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 0 days.

(21) Appl. No.: 11/921,429

(22) PCT Filed: May 26, 2006

(86) PCT No.: PCT/JP2006/311045
§ 371 (c)(1),
(2), (4) Date: Nov. 30, 2007

(87) PCT Pub. No.: WO2006/137254
PCT Pub. Date: Dec. 28, 2006

(65) Prior Publication Data
US 2010/0018437 A1    Jan. 28, 2010

(30) Foreign Application Priority Data

Jun. 24, 2005 (JP) .................. 2005-184199

(51) Int. Cl.
*C09D 11/00* (2006.01)
(52) U.S. Cl. ...................... 106/31.9; 106/400
(58) Field of Classification Search ............... 106/31.9, 106/400
See application file for complete search history.

(56) References Cited

U.S. PATENT DOCUMENTS

| 6,218,459 B1 * | 4/2001 | Gruning et al. | 524/538 |
| 2009/0114119 A1 * | 5/2009 | Horii | 106/31.6 |

FOREIGN PATENT DOCUMENTS

WO    WO 2005010105 A2 *  2/2005

\* cited by examiner

*Primary Examiner* — Jerry Lorengo
*Assistant Examiner* — Veronica Faison Gee
(74) *Attorney, Agent, or Firm* — Flynn, Thiel, Boutell & Tanis, P.C.

(57) ABSTRACT

A carbon black aqueous dispersion which has excellent dispersibility in an aqueous medium and is suitable as an aqueous black ink, such as an inkjet printer ink and a method of producing the same. The carbon black aqueous dispersion includes an aqueous medium and a carbon black pigment dispersed in the aqueous medium, wherein some or all of the hydrogen atoms of the acidic groups produced by liquid-phase oxidation of the carbon black are replaced with a basic amino acid salt group by neutralization with a basic amino acid. The method of producing a carbon black aqueous dispersion includes subjecting carbon black to liquid-phase oxidation, removing reduced salts from the resulting slurry, neutralizing the slurry with a basic amino acid to replace some or all of the hydrogen atoms of the acidic groups with a basic amino acid salt group to form a basic amino acid salt compound, and purifying the resulting product.

4 Claims, No Drawings

CARBON BLACK AQUEOUS DISPERSION AND METHOD OF PRODUCING THE SAME

TECHNICAL FIELD

The present invention relates to a carbon black aqueous dispersion suitable as an aqueous black ink for an inkjet printer or the like and a method of producing the same.

BACKGROUND ART

It is extremely difficult to stably disperse carbon black in water at a high concentration due to its hydrophobicity and low wettability with water. This is because the surface of carbon black has an extremely small number of functional groups having a high affinity with water molecules (e.g. hydrophilic hydrogen-containing functional groups such as a carboxyl group and a hydroxyl group). A known measure is to improve the dispersibility of carbon black in water by oxidizing the carbon black to produce hydrophilic functional groups on the surface of the carbon black.

For example, Patent Document 1 (JP-A-48-018186) discloses a method of oxidizing carbon black with a hypohalite aqueous solution, and Patent Document 2 (JP-A-57-159856) discloses a method of oxidizing carbon black by a low-temperature oxygen plasma.

A method of producing an aqueous ink is also known in which the dispersibility of moderately oxidized carbon black in water is improved by using a coupling agent or a surfactant (e.g., JP-A-04-189877). However, it is difficult to stably maintain the dispersibility for a long period of time since the surfactant or the like is oxidized or decomposed due to a change in temperature and a change with time.

Patent Document 4 (JP-A-08-003498) discloses a water-based pigment ink including water and carbon black having a surface active hydrogen content of 1.5 mmol/g or more, and a method of producing a water-based pigment ink including water and carbon black comprising (a) providing acidic carbon black and (b) further oxidizing the acidic carbon black in water using a hypohalite. Patent Document 5 (JP-A-08-319444) discloses a method of producing a water-based pigment ink including finely dispersing carbon black with an oil absorption of 100 ml/100 g or less in an aqueous medium and oxidizing the carbon black using a hypohalite.

According to Patent Documents 4 and 5, a water-based pigment ink with excellent water-dispersibility and long-term dispersion stability is obtained by oxidizing carbon black so that a large amount of active hydrogen (i.e., hydrophilic functional groups) is formed on the surface of the carbon black.

However, the number of hydrophilic functional groups existing at the contact interface between the surfaces of carbon black particles and water molecules is important for dispersing carbon black in water and maintaining a stable dispersed state. Therefore, it is difficult to accurately determine the dispersibility merely by the number of functional groups per unit weight of carbon black. When using a method of finely atomizing carbon black in water using glass beads and oxidizing the carbon black using a hypohalite to treat the surface of the carbon black while improving its dispersibility, the atomization effect is diminished due to the buoyancy applied to the glass beads in water. Moreover, an active site is formed with difficulty. As a result, it is difficult to uniformly form functional groups on the surface of carbon black.

Patent Document 6 (JP-A-11-148027) discloses water-dispersible carbon black which is modified by oxidation and in which the total amount of carboxyl groups and hydroxyl groups among the hydrogen-containing functional groups per unit surface area of the carbon black is 3 µeq/m$^2$ or more.

Patent Document 7 (JP-A-09-286938) discloses a water-based pigment ink in which carbon black is oxidized with a hypohalous acid and/or a hypohalite and at least some of the acidic groups existing on the surface of the oxidized carbon black are bonded to an amine compound to form an ammonium salt.

As the amine compound, ammonia, a volatile amine substituted with an alkyl group having 1 to 3 carbon atoms, an amine compound substituted with an alkanol group (i.e., alkanolamine or alkylalkanolamine), or the like is used. Since amine compounds, with the exception of ammonia, have an extremely low degree of dissociation, a substitution reaction with hydrogen of the acidic group occurs only with difficulty.

DISCLOSURE OF THE INVENTION

The present invention has been made to solve the above problems of the related art and has an object of providing a carbon black aqueous dispersion which has an excellent dispersibility in an aqueous medium and is suitable as an aqueous black ink, such as an inkjet printer ink, and a method of producing the same.

Specifically, a carbon black aqueous dispersion according to the present invention comprises an aqueous medium and a carbon black pigment dispersed in the aqueous medium, wherein some or all of the hydrogen atoms of the acidic groups produced by liquid-phase oxidation of the carbon black are replaced with a basic amino acid salt group by neutralization with a basic amino acid.

A method of producing the above carbon black aqueous dispersion comprises subjecting carbon black to liquid-phase oxidation, removing reduced salts from the resulting slurry, neutralizing the slurry with a basic amino acid to replace some or all of the hydrogen atoms of the acidic groups with a basic amino acid salt group to form a basic amino acid salt compound, and purifying the resulting product.

BEST MODE FOR CARRYING OUT THE INVENTION

The carbon black applied in the present invention is not specifically limited, but may be furnace black, channel black, acetylene black, thermal black, or the like.

The carbon black is oxidized by liquid-phase oxidation in which the carbon black is stirred/mixed in an aqueous solution of an oxidizing agent such as nitric acid, sulfuric acid, a chlorate, a persulfate, a perborate, or a percarbonate. Liquid-phase oxidation is performed by adding the carbon black to an aqueous solution of the oxidizing agent, adjusting the concentration of the oxidizing agent, the quantitative ratio of the carbon black, and the like, and stirring the mixture at approximately room temperature to 90° C. for an appropriate amount of time.

Hydrophilic acidic groups such as carboxyl groups and hydroxyl groups are produced on the surface of the carbon black particles. The carbon black aqueous dispersion of the present invention is characterized in that some or all of the terminal hydrogen atoms of the acidic groups are replaced with a basic amino acid salt group by neutralization with a basic amino acid.

As the basic amino acid, arginine, ornithine, lysine histidine, and derivatives thereof of which an alkyl group is replaced with a substituent are preferable. Of these, arginine and lysine are particularly preferable. As examples of the substituent, a substituted or unsubstituted alkyl group, a hydroxyl group, a halogen atom, a phenyl group, and the like can be given.

The surface-modified carbon black has an extremely improved dispersibility in an aqueous medium. Thus, the aqueous dispersion containing the carbon black as a pigment has an improved dispersion stability, viscosity, filterability, and discharge stability. An ink prepared using the carbon black aqueous dispersion has excellent feathering properties, friction resistance, discharge performance, and the like, and is suitably used as an aqueous black ink such as an inkjet printer ink.

The aqueous medium mainly contains water. Other water-soluble organic solvents may also be used. It is preferable to use water (particularly deionized water) in terms of low cost and safety.

As examples of the water-soluble organic solvent, water-soluble alcohols such as methanol, ethanol, 1-propanol, and 2-propanol, water-soluble ethers such as diethylene glycol dimethyl ether and diethylene glycol diethyl ether, water-soluble keytones such as acetone, water-soluble fatty acids such as formic acid, acetic acid, propionic acid, and butyric acid, water-soluble nitrogen compounds such as N,N-dimethylformamide and N-methylpyrrolidone, water-soluble sulfur compounds such as dimethylsulfoxide, and the like can be given. The water-soluble organic solvent is not particularly limited as long as the organic solvent is water-soluble.

A method of producing the carbon black aqueous dispersion comprises subjecting the carbon black to liquid-phase oxidation, removing reducing salts from the resulting slurry, neutralizing the slurry with a basic amino acid to replace some or all of the hydrogen atoms of the acidic groups with a basic amino acid salt group to form a basic amino acid salt compound, and purifying the resulting product.

Liquid-phase oxidation of the carbon black is performed by mixing the carbon black into an aqueous solution of an oxidizing agent having an adjusted concentration at an appropriate quantitative ratio, and stirring the mixture at approximately room temperature to 90° C., and preferably 60 to 90° C. to form a slurry. The carbon black is oxidized in the slurry.

Hydrophilic acidic groups such as carboxyl groups and hydroxyl groups are produced on the surface of the carbon black by oxidation. If the carbon black is subjected to wet or dry oxidation in advance, carbon black can be dispersed efficiently in water to be oxidized uniformly and effectively. Wet oxidation is performed using ozone water, a hydrogen peroxide aqueous solution, persulfuric acid, or a persulfate. Dry oxidation is performed by exposing the carbon black to a gas atmosphere such as ozone, oxygen, $NO_x$, or $SO_x$.

It is preferable to add a surfactant so that the carbon black is dispersed uniformly in the slurry. An anionic, nonionic, or cationic surfactant may be used.

The acidic groups such as carboxyl groups and hydroxyl groups produced on the surface of the carbon black by liquid-phase oxidation are neutralized. If reduced salts in the slurry produced by liquid-phase oxidation are removed before neutralization, the neutralization reaction proceeds smoothly and efficiently. A separation membrane such as an ultrafilter (UF) membrane, a reverse osmosis (RO) membrane, or an electrodialysis membrane is suitably used for removing such reduced salts.

The slurry from which the reduced salts have been removed is neutralized with a basic amino acid. As the basic amino acid, arginine, ornithine, lysine, histidine, and derivatives thereof of which an alkyl group is replaced with a substituent are preferable, as described above. In particular, arginine and lysine are preferable. Some or all of the hydrogen atoms of the acidic groups are replaced with a basic amino acid salt group by neutralization, whereby a basic amino acid salt compound is formed.

Neutralization may be performed at room temperature. It is preferable to add the basic amino acid to the slurry with stirring at room temperature to 100° C. for 3 to 20 hours while adjusting the pH to 4.0 to 12.0 so that the neutralization reaction proceeds smoothly.

Salts produced by neutralization which hinder the dispersibility in water are removed by purification. Removal of salts is also effective for preventing reaggregation of the carbon black in the slurry. Reduced salts are removed by purification using a separation membrane such as an ultrafilter (UF) membrane, a reverse osmosis (RO) membrane, or an electrodialysis membrane. Purification is performed preferably to such an extent that the conductivity of the slurry is 5 mS/cm or less when the content of the carbon black is 20 wt %, for example.

In the case where large undispersed clusters or coarse particles exist in the purified slurry, the large undispersed clusters or coarse particles are classified and removed by centrifugation, filtration, or the like in order to prevent clogging of an inkjet printer nozzle.

The agglomerates of the carbon black particles in the slurry which have been purified and classified as necessary are atomized. The atomization process is performed by spraying the slurry from a nozzle under pressure at high speed to cause a collision between sprayed streams or between sprayed streams and a wall surface. The carbon black agglomerates in the slurry are atomized by collision, a shear force at the time of spraying, and the like. The processes may be performed in the order of neutralization, atomization, and purification.

Various commercially-available atomizers may be used as a means to atomize the carbon black agglomerates. Examples of such atomizers include Microfluidizer (manufactured by Microfluidics Corporation), Ultimizer (manufactured by Sugino Machine Limited), Nanomizer (manufactured by Tokai Corporation), a high-pressure homogenizer, and the like. The carbon black agglomerates are preferably atomized to such an extent that the maximum particle diameter of the agglomerates becomes 1 μm or less by spraying the slurry from a spray nozzle under a pressure of 50 to 250 MPa, for example.

The size of the carbon black agglomerates is measured by the following method.

Specifically, the concentration of the carbon black in the slurry is adjusted to 0.1 to 0.5 $kg/cm^3$. A heterodyne laser Doppler particle size distribution measurement device (UPA model 9340 manufactured by Microtrac Inc.) is used for the measurement. A cumulative frequency distribution curve is created from the particle diameters of the carbon black agglomerates thus measured. A value corresponding to a cumulative percentage of 50% is determined to be the average particle diameter (Dupa 50%, m) of the carbon black agglomerates, and a value corresponding to a cumulative frequency of 99% of the cumulative frequency distribution curve is determined to be the maximum particle diameter (Dupa 99%, m) of the carbon black agglomerates.

A carbon black aqueous dispersion in which the carbon black is finely dispersed in the aqueous medium is thus produced. The carbon black aqueous dispersion may be further purified and concentrated to produce an aqueous black ink used for an inkjet printer or the like, for example.

Specifically, an aqueous black ink is prepared by adding or removing water to adjust the carbon black dispersion concentration to an appropriate concentration (e.g., 0.1 to 20 wt %), and optionally adding commonly-used ink additives such as an antiseptic agent, a viscosity regulator, and a resin.

EXAMPLES

The present invention is described below in detail by way of examples. Note that the following examples illustrate one aspect of the present invention, and should not be construed as limiting the present invention.

Example 1

150 g of carbon black (TB#4550F manufactured by Tokai Carbon Co., Ltd.) was added to 3,000 ml of a 2.0 N ammonium persulfate solution. The mixture was then subjected to liquid-phase oxidation at a reaction temperature of 60° C., a reaction time of 10 hours, and a stirring speed of 300 rpm. After removing reduced salts from the slurry by an ultrafilter membrane (AHP-1010 manufactured using Asahi Kasei Corporation; molecular weight cutoff: 50,000), the slurry was neutralized with L-arginine.

After neutralization, the remaining salts were separated from the slurry by purification using an ultrafilter membrane (AHP-1010 manufactured by Asahi Kasei Corporation; molecular weight cutoff: 50,000). The resulting product was then concentrated to produce a carbon black aqueous dispersion.

Example 2

A carbon black aqueous dispersion was produced in the same manner as in Example 1 except for using histidine instead of L-arginine.

Comparative Example 1

A carbon black aqueous dispersion was produced in the same manner as in Example 1 except for using a lithium hydroxide solution instead of L-arginine.

Comparative Example 2

A carbon black aqueous dispersion was produced in the same manner as in Example 1 except for using butylamine instead of L-arginine.

The carbon black concentration of each of the carbon black aqueous dispersions obtained in Examples 1 and 2 and Comparative Examples 1 and 2 was adjusted to 20 wt %. The dispersibility of the carbon black was then evaluated by the following methods.

Viscosity:

A sample was placed in an airtight container and maintained at 70° C. A change in viscosity was measured after 1 to 4 weeks using a rotational vibration type viscometer (VM-100-L manufactured by Yamaichi Electronics Co., Ltd.).

Particle Diameters of Carbon Black Agglomerates:

The particle diameters of the carbon black agglomerates of each sample subjected to the viscosity measurement were measured using a heterodyne laser Doppler particle size distribution measurement device (UPA model 9340 manufactured by Microtrac Inc.) to create a cumulative frequency distribution curve. A value corresponding to a cumulative percentage of 99% was determined to be the maximum particle diameter (Dupa 99%) of the carbon black agglomerates, and a value corresponding to a cumulative percentage of 50% was determined to be the average particle diameter (Dupa 50%) of the carbon black agglomerates.

As a test for an aqueous organic medium, the carbon black aqueous dispersion (concentration: 20 wt %) was added to ethanol (99% or more) and 2-methylpyrrolidone instead of water, and the particle diameters of the agglomerates were measured.

Filterability:

A filtration test was conducted in which 200 g of a sample was filtered through a No. 2 filter paper (diameter: 90) or a filter having a pore size of 3 μm, 0.8 μm, 0.65 μm, or 0.45 μm under a reduced pressure of 20 torr. The amount of the sample filtered was measured.

The results are shown in Table 1.

TABLE 1

|  | Example 1 | Example 2 | Example 3 | Example 4 |
|---|---|---|---|---|
| Viscosity (cp) | | | | |
| Initial | 4.52 | 4.53 | 4.89 | 4.36 |
| 70° C. after 1 week | 4.32 | 4.36 | 4.89 | gelled |
| 70° C. after 2 weeks | 4.32 | 4.36 | 4.94 | gelled |
| 70° C. after 3 weeks | 4.31 | 4.34 | 4.98 | gelled |
| 70° C. after 4 weeks | 4.31 | 4.34 | 5.02 | gelled |
| Average particle diameter of agglomerates (nm) | | | | |
| Initial | 164.3 | 164.1 | 168.4 | 162.1 |
| 70° C. after 1 week | 164.2 | 167.2 | 169.2 | unmeasureable |
| 70° C. after 2 weeks | 164.4 | 167.1 | 169.7 | unmeasureable |
| 70° C. after 3 weeks | 164.2 | 167.3 | 170.1 | unmeasureable |
| 70° C. after 4 weeks | 164.1 | 167.2 | 171.4 | unmeasureable |
| Maximum particle diameter of agglomerates (nm) | | | | |
| Initial | 337.8 | 337.3 | 342.1 | 368.4 |
| 70° C. after 1 week | 337.6 | 337.1 | 343.4 | unmeasureable |
| 70° C. after 2 weeks | 337.8 | 337.1 | 344.5 | unmeasureable |
| 70° C. after 3 weeks | 337.8 | 337.2 | 345.7 | unmeasureable |
| 70° C. after 4 weeks | 337.8 | 337.3 | 346.4 | unmeasureable |
| In ethanol medium | | | | |
| Average particle diameter (nm) | 164.1 | 167.3 | aggregated | 162.1 |
| Maximum particle diameter (nm) | 337.8 | 337.2 | aggregated | 368.1 |
| In 2-methylpyrrolidone medium | | | | |
| Average particle diameter (nm) | 164.3 | 167.2 | aggregated | 162.1 |
| Maximum particle diameter (nm) | 338.2 | 337.1 | aggregated | 368.1 |

TABLE 1-continued

|  | Example 1 | Example 2 | Example 3 | Example 4 |
|---|---|---|---|---|
| Filterability (%) | | | | |
| No. 2 filter paper | 100 | 100 | 100 | 100 |
| Pore size: 3 μm | 100 | 100 | 100 | 100 |
| Pore size: 0.8 μm | 100 | 100 | 100 | 80 |
| Pore size: 0.65 μm | 100 | 100 | 50 | 0 |
| Pore size: 0.45 μm | 35 | 35 | 0 | 0 |

The carbon black concentration of each of the carbon black aqueous dispersions obtained in Examples 1 and 2 and Comparative Examples 1 and 2 was adjusted to 15 wt %. An inkjet recording ink was prepared by mixing 33.3% of the carbon black aqueous dispersion, 20.0% of an aqueous organic solvent (glycerin), 0.2% of a surfactant (Emulgen 106), 0.2% of an amine compound (triisopropanolamine), and 41.3% of deionized water (ultrapure water). The feathering properties, the friction resistance, the discharge performance, and the metal corrosiveness were evaluated using the following methods. The results are shown in Table 2.

Feathering Properties:
Alphanumeric characters were printed on a Xerox 4200 paper using an MFC-3100C printer (manufactured by Brother Industries, Ltd.). After allowing the paper to stand for 1 hour or more, the clarity of the characters and feathering of the characters were observed under a microscope and with the naked eye to evaluate the effects on the image according to the following standard.
Excellent: Clear printing with almost no feathering
Good: Clear printing with no significant feathering
Poor: Unclear printing with rather significant feathering
Bad: Unclear printing with significant feathering Friction Resistance:
Alphanumeric characters were printed on a Xerox 4200 paper using an MFC-3100C printer (manufactured by Brother Industries, Ltd.). After allowing the paper to stand for a specific period of time, unprinted paper of the same type was placed on the printed paper, and a flat and smooth weight (100 g) was put on the paper. The printed paper was then quickly pulled out. The time required for the printed paper to stand so that printing did not blur was measured and evaluated according to the following standard.
Good: 15 seconds or less
Bad: 16 seconds or more Discharge Performance:
Printing was performed using an MFC-3100C printer (manufactured by Brother Industries, Ltd.) for checking the discharge stability and discharge response. The discharge stability was checked by continuously discharging the ink for 24 hours at each temperature of 5° C., 20° C., and 40° C. The discharge response was checked by performing a 1-minute intermittent discharge 100 times. After two months, whether or not the ink could be discharged was checked. A case where the ink could be injected normally during the discharge stability check and the discharge response check and printed without clogging the inkjet head was evaluated as "Good". Otherwise, it was evaluated as "Bad."

Metal Corrosiveness:
A piece of iron-nickel alloy used as a raw material for a metal member provided in an ink supply path was immersed in the ink at 60° C. for 2 hours. The surface of the alloy piece was visually observed before and after immersion to evaluate the degree of corrosion.
Good: The surface of the alloy piece was not corroded or showed a small degree of discoloration.
Bad: The surface of the alloy piece was corroded.

TABLE 2

|  | Feathering properties | Friction resistance | Discharge performance | Metal corrosiveness |
|---|---|---|---|---|
| Example 1 | Excellent | Good | Good | Good |
| Example 2 | Excellent | Good | Good | Good |
| Comparative Example 1 | Good | Bad | Good | Good |
| Comparative Example 2 | Bad | Bad | Bad | Good |

The above results show that the carbon black aqueous dispersions of the examples have a stable dispersibility in water and aqueous media of a water-soluble organic solvent and that the inks prepared using the aqueous dispersions are extremely useful as an aqueous black ink for an inkjet printer or the like due to its excellent feathering properties, friction resistance, and discharge performance.

INDUSTRIAL APPLICABILITY

The carbon black aqueous dispersion according to the present invention, in which some or all of hydrogen atoms of acidic groups such as hydroxyl groups and carboxyl groups produced on the surface of the carbon black by liquid-phase oxidation of the carbon black are replaced with a basic amino acid salt group, has excellent dispersibility in an aqueous medium. An ink prepared using the carbon black aqueous dispersion has excellent feathering properties, friction resistance, and discharge performance, and can suitably be used as an aqueous black ink such as an inkjet printer ink.

The invention claimed is:

1. A carbon black aqueous dispersion comprising an aqueous medium and a carbon black pigment dispersed in the aqueous medium, wherein some or all of hydrogen atoms of acidic groups produced by liquid-phase oxidation of the carbon black in an ammonium persulfate solution are replaced with a basic amino acid salt group by neutralization with a basic amino acid.

2. A method of producing a carbon black aqueous dispersion comprising subjecting carbon black to liquid-phase oxidation by adding the carbon black to an aqueous solution of ammonium persulfate to form a mixture, stirring the mixture to form a resulting slurry, removing reduced salts from the resulting slurry, neutralizing the slurry with a basic amino acid to replace some or all of hydrogen atoms of acidic groups with a basic amino acid salt group to form a resulting basic amino acid salt compound product, and purifying the resulting product.

3. The method of claim 2, where the neutralization is performed solely with a basic amino acid.

4. A carbon black aqueous dispersion comprising an aqueous medium and a carbon black pigment dispersed in the aqueous medium, wherein some or all of hydrogen atoms of acidic groups produced by liquid-phase oxidation of the carbon black are replaced with a basic amino acid salt group by neutralization with a basic amino acid selected from the group consisting of L-arginine and histidine.

* * * * *